(12) United States Patent
Ranjan

(10) Patent No.: US 10,460,448 B2
(45) Date of Patent: Oct. 29, 2019

(54) METHOD FOR QUANTIFICATION OF UNCERTAINTY OF CONTOURS IN MANUAL AND AUTO SEGMENTING ALGORITHMS

(71) Applicant: KONINKLIJKE PHILIPS N.V., Eindhoven (NL)

(72) Inventor: Uma Satya Ranjan, Bangalore (IN)

(73) Assignee: KONINKLIJKE PHILIPS N.V., Eindhoven (NL)

(*) Notice: Subject to any disclaimer, the term of this patent is extended or adjusted under 35 U.S.C. 154(b) by 8 days.

(21) Appl. No.: 14/375,836

(22) PCT Filed: Feb. 5, 2013

(86) PCT No.: PCT/IB2013/050952
§ 371 (c)(1),
(2) Date: Jul. 31, 2014

(87) PCT Pub. No.: WO2013/121321
PCT Pub. Date: Aug. 22, 2013

(65) Prior Publication Data
US 2015/0043797 A1 Feb. 12, 2015

Related U.S. Application Data

(60) Provisional application No. 61/598,368, filed on Feb. 14, 2012.

(51) Int. Cl.
*G06T 7/149* (2017.01)
*G06T 7/12* (2017.01)

(52) U.S. Cl.
CPC .......... *G06T 7/149* (2017.01); *G06T 7/12* (2017.01); *G06T 2207/10104* (2013.01);
(Continued)

(58) Field of Classification Search
None
See application file for complete search history.

(56) References Cited

U.S. PATENT DOCUMENTS

| 5,970,164 A * | 10/1999 | Bamberger et al. .......... 382/128 |
| 2005/0237341 A1* | 10/2005 | Gangnet ............... G06T 11/001 345/606 |
| 2008/0159606 A1* | 7/2008 | Suri .......................... G06T 7/12 382/128 |
| 2008/0170791 A1* | 7/2008 | Eskildsen ................ G06K 9/48 382/199 |

(Continued)

FOREIGN PATENT DOCUMENTS

| DE | 102010022307 A1 | 12/2011 |
| EP | 2878338 A1 * | 6/2015 ........... A61N 5/1031 |
| WO | 2009027889 A2 | 3/2009 |

OTHER PUBLICATIONS

Xi Zhao; Stein, A.; Xiaoling Chen; Xiang Zhang, "Quantification of Extensional Uncertainty of Segmented Image Objects by Random Sets," in Geoscience and Remote Sensing, IEEE Transactions on, vol. 49, No. 7, pp. 2548-2557, Jul. 2011.*

(Continued)

*Primary Examiner* — Jiangeng Sun

(57) ABSTRACT

A system (10) quantifies uncertainty in contours. The system (10) includes at least one processor (42) programmed to receive an image (18) including an object of interest OOI (20). Further, a band of uncertainty (32) delineating a region (34) in the received image (18) is received. The region (34) includes the boundary of the OOI (20). The boundary is delineated in the region (34) using iterative filtering of the region (34) and a metric of uncertainty of the delineation is determined for the region (34).

3 Claims, 5 Drawing Sheets

(52) U.S. Cl.
CPC .............. *G06T 2207/20012* (2013.01); *G06T 2207/20116* (2013.01); *G06T 2207/30096* (2013.01)

(56) References Cited

U.S. PATENT DOCUMENTS

| | | | |
|---|---|---|---|
| 2009/0257627 A1* | 10/2009 | Nay | G06T 7/11 382/128 |
| 2010/0104513 A1* | 4/2010 | Rittscher et al. | 424/9.1 |
| 2012/0075638 A1* | 3/2012 | Rollins et al. | 356/479 |

OTHER PUBLICATIONS

Ray, S., Hagge, R., Gillen, M., Cerejo, M., Shakeri, S., Beckett, L., & . . . Badawi, R. D. (2008). Comparison of two-dimensional and three-dimensional iterative watershed segmentation methods in hepatic tumor volumetrics. Medical Physics, 35(12), 5869-5881.*

Maria Lyra and Agapi Ploussi, Filtering in SPECT Image Reconstruction, Jan. 25, 2011.*

Ray, S., et al.; Comparison of two-dimensional and three-dimensional iterative watershed segmentation methods in hepatic tumor volumetrics; 2008; Med. Phys.; 35(12)5869-5881.

Shen, W-C., et al.; Computer Aided Classification System for Breast Ultrasound Based on Breast Imaging Reporting and Data System (BI-RADS); 2007; Ultrasound in Med. & Biol.; 33(11)1688-1698.

Zhao, X., et al.; Quantification of Extensional Uncertainty of Segmented Image Objects by Random Sets; 2007; IEEE Trans. on Geoscience and Remote Sensing; 49(7)2548-2553.

* cited by examiner

METHOD FOR QUANTIFICATION OF UNCERTAINTY OF CONTOURS IN MANUAL AND AUTO SEGMENTING ALGORITHMS

CROSS REFERENCE TO RELATED APPLICATIONS

This application is a national filing of PCT application Serial No. PCT/IB2013/050952, filed Feb. 5, 2013, published as WO 2013/121321 A1 on Aug. 22, 2013, which claims the benefit of U.S. provisional application Ser. No. 61/598,368 filed Feb. 14, 2012, which is incorporated herein by reference.

The present application relates generally to image processing. It finds particular application in conjunction with segmenting medical images and will be described with particular reference thereto. However, it is to be understood that it also finds application in other usage scenarios and is not necessarily limited to the aforementioned application.

The grade and intensity of a lesion, such as a tumor, is an important factor in determining a diagnosis and available treatment options for the patient. Typically, the grade and intensity of a lesion is determined by assessing images of the lesion. Nuclear medical imaging modalities are the primary imaging modality for generating the images. In assessing the images, lesion delineation is an important step for correctly determining the grade and intensity of the lesion. However, lesion delineation can be challenging.

Malignant tumors are characterized by fuzzy and irregular boundaries. Hence, detection of lesion boundaries is a difficult problem and often requires the manual intervention of skilled physicians. In some cases, even skilled physicians are unable to determine the boundary with confidence. Filtering methods exist to enhance an image, but methods of filtering are based on correcting the image for errors such as scatter, attenuation, and so on. When the anatomy is inherently fuzzy, the resultant filtered image continues to be difficult to outline and delineate. Hence, there may be a low confidence level in lesion delineation.

A low confidence in the lesion boundary is not necessarily a disadvantage. Physicians use the irregular and imprecise nature of the boundary as an important characteristic of tumors which distinguishes tumors from benign lesions. For example, tumor boundary irregularity can be used to distinguish between active tuberculosis nodules and malignant lesions (both of which have high metabolism and take up fluorodeoxyglucose (FDG) in positron emission tomography (PET) preferentially). Hence, it is important to characterize, preferably quantitatively, the uncertainty in delineation of the boundary for aiding diagnosis and indicating the confidence in the results.

Current methods of region demarcation result in a binary output which indicates the decision made by a user or an algorithm. Further, even if the boundary is to be further modified, it can only be done so on the basis of a new evaluation. The uncertainty of the previously identified boundary is not used to guide the next stage or assess confidence in final results. Further, there is no way for obtaining uncertainty information from automatic algorithms.

The present application provides new and improved methods and systems which overcome the above-referenced challenges and others.

In accordance with one aspect, a system for quantification of uncertainty of contours is provided. The system includes at least one processor programmed to receive an image including an object of interest (OOI). Further, a band of uncertainty delineating a region in the received image is received. The region includes the boundary of the OOI. The boundary in the region is delineated using iterative filtering of the region and at least one metric of uncertainty of the delineation for the region is determined.

In accordance with another aspect, a method for quantification of uncertainty of contours is provided. The method includes receiving an image including an object of interest (OOI). Further, a band of uncertainty delineating a region in the received image is received. The region includes the boundary of the OOI. The boundary is delineated in the region using iterative filtering of the region and at least one metric of uncertainty of the delineation is determined for the region.

In accordance with another aspect, a system for quantification of uncertainty of contours is provided. The system includes a processor programmed to receive an image including an object of interest (OOI). Further, a band of uncertainty delineating a region in the received image is received. The region includes the boundary of the OOI. For each of a plurality of sub-regions of the region, a determination as to whether to filter the sub-region is made. The determination including at least one of determining whether the boundary of the OOI can be delineated in the sub-region with a confidence level exceeding a first predetermined level and determining whether a stopping condition is met. The stopping condition indicates the confidence level is less than a second predetermined level. In response to determining the the boundary of the OOI can be delineated in the sub-region with the confidence level exceeding the first predetermined level or the stopping condition being met, the boundary of the OOI is delineated in the sub-region. In response to determining the the boundary of the OOI cannot be delineated in the sub-region with the confidence level exceeding the first predetermined level and the stopping condition not being met, the sub-region is iteratively filtered a predetermined number of times and the determination as to whether to filter the sub-region is repeated.

One advantage resides in separate identification and quantification of areas of certainty and areas of uncertainty.

Another advantage resides in filtering sub-regions to a different extent based on a confidence level.

Another advantage resides in providing experts additional information to aid in segmentation of areas of uncertainty.

Another advantage resides in less time for accurate delineation in areas of irregular, fuzzy boundaries.

Another advantage resides in indicating accuracy of a part of or the entire identified boundary.

Still further advantages of the present invention will be appreciated to those of ordinary skill in the art upon reading and understand the following detailed description.

The invention may take form in various components and arrangements of components, and in various steps and arrangements of steps. The drawings are only for purposes of illustrating the preferred embodiments and are not to be construed as limiting the invention.

FIG. 6A-D illustrate an image at increasing degrees of filtering.

Figure 7:
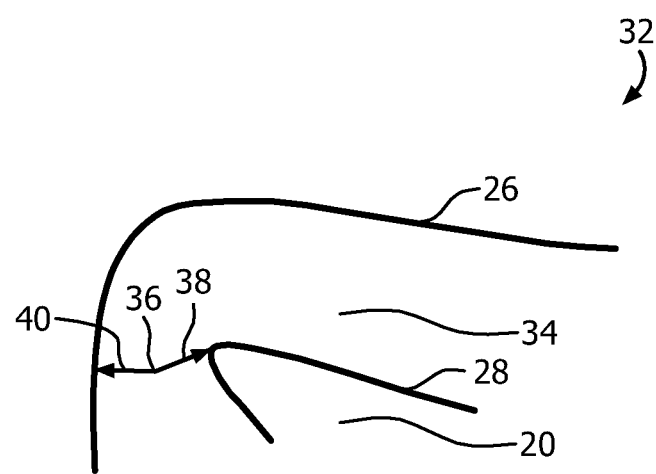

FIG. 7 illustrates a portion of a band of uncertainty with an inner segment and an outer segment of a point of uncertainty.

Figure 1:
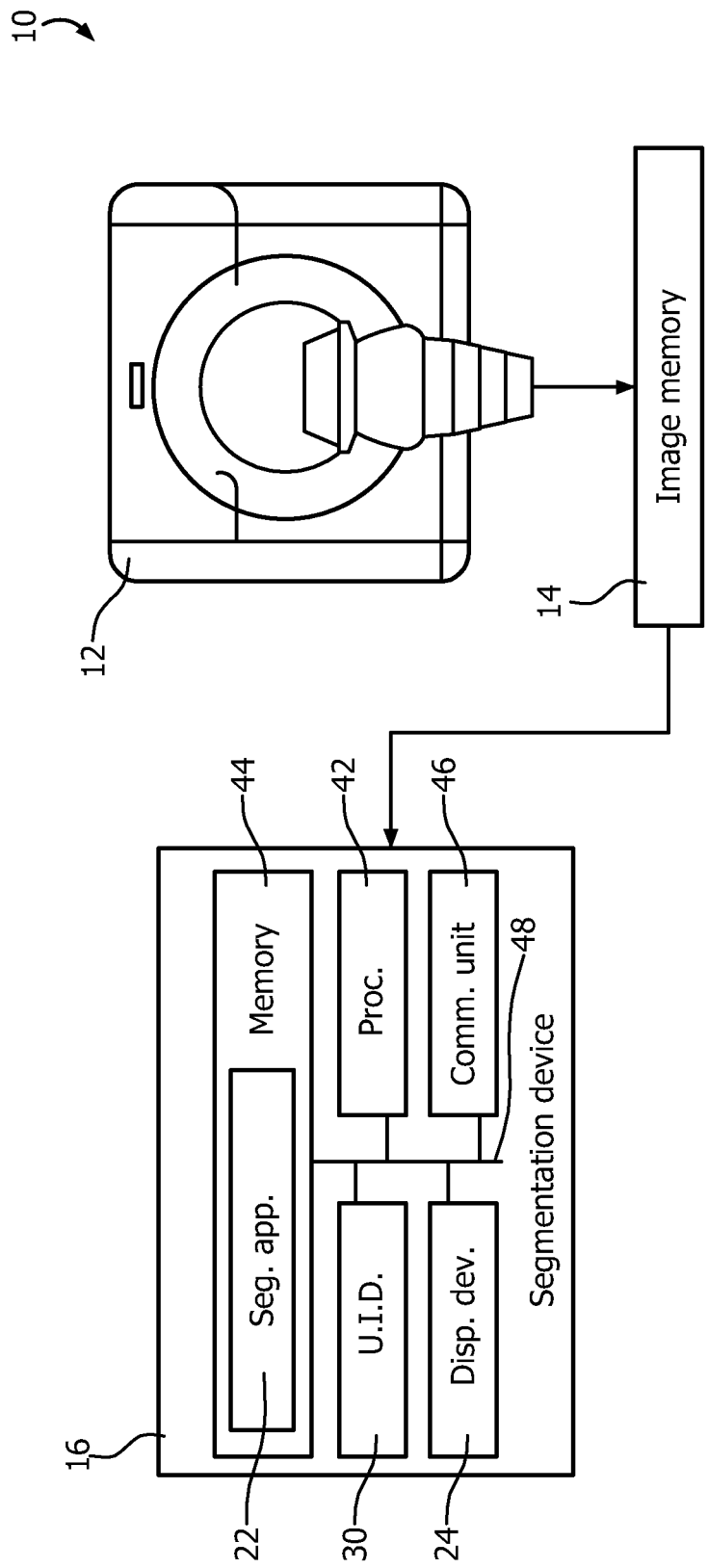
FIG. 1 illustrates a block diagram of a system for quantifying uncertainty of contours in manual and auto segmenting algorithms.

With reference to FIG. 1, a therapy system 10 includes one or more imaging modalities 12 for acquiring images of objects of interest, such as legions, within patients. The imaging modalities 12 suitably include one or more of a computed tomography (CT) scanner, a positron emission tomography (PET) scanner, a magnetic resonance (MR) scanner, a single photon emission computed tomography (SPECT) scanner, a cone-beam computed tomography (CBCT) scanner, and the like. Images acquired from the imaging modalities 12 are stored in one or more image memories 14.

Figure 2:
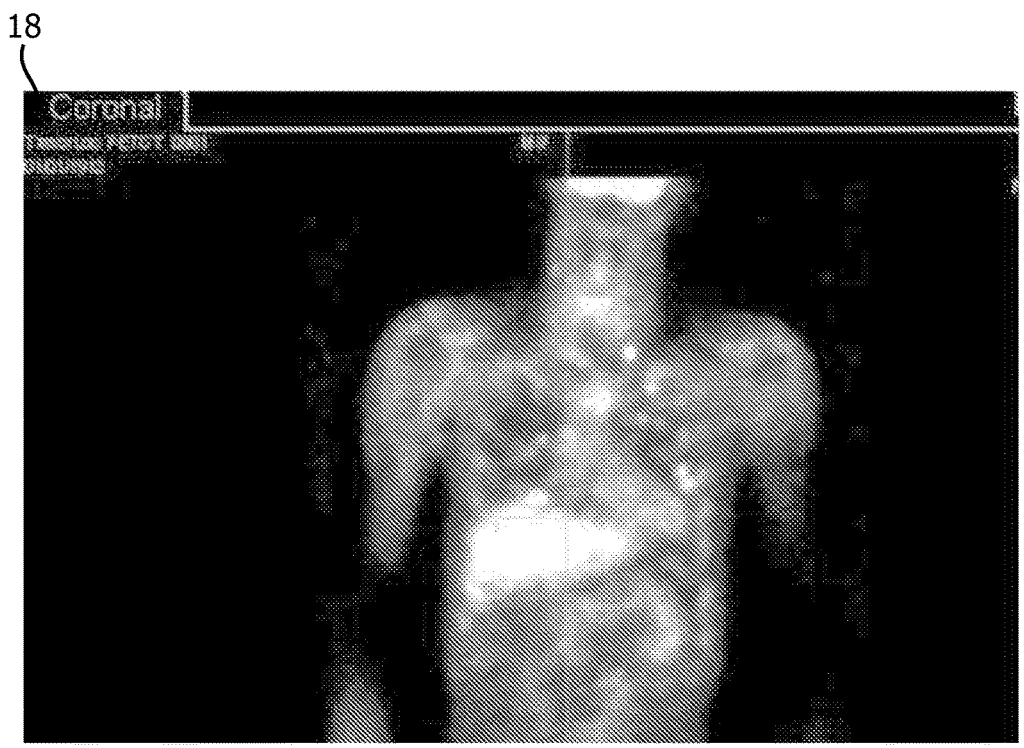
FIG. 2 illustrates a positron emission tomography (PET) image of a patient with malignant lesions in the lung.
Figure 3:
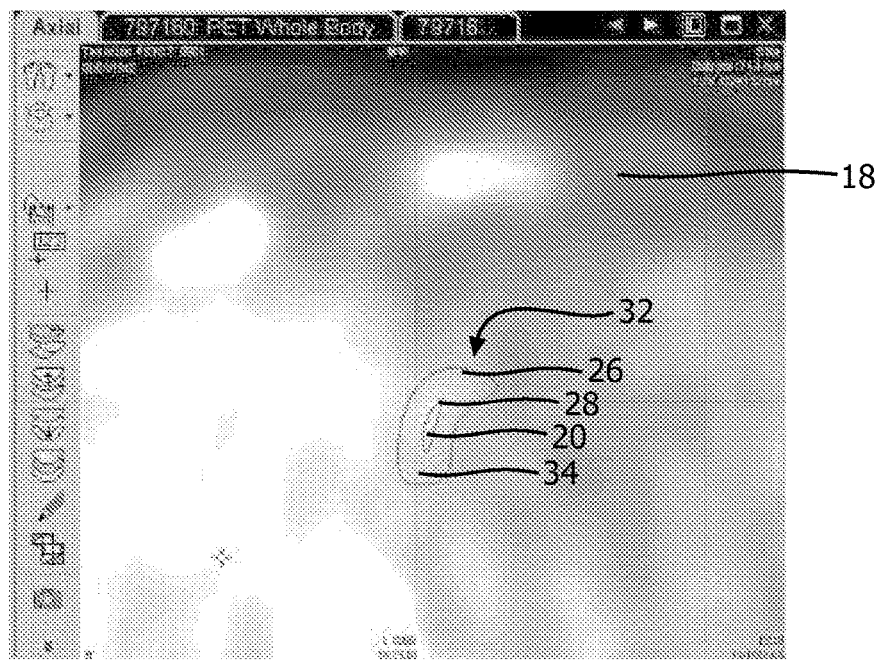
FIG. 3 illustrates a zoomed axial view of the PET image of FIG. 2.

A segmentation device 16 receives an image 18, such as a three- and/or four-dimensional image, of an object of interest (OOI) 20, such as a lesion, an example of which is shown in FIGS. 2 and 3. The received image 18 can, for example, be a Dynamic Contrast Enhanced MR image. Typically, the image 18 is received from the imaging modalities 12 and/or the image memories 14. For example, the image 18 can be received from the imaging modalities 12 through the image memories 14. However, other sources for the image 18 are contemplated. Further, the image 18 is typically received from nuclear imaging modalities. Through execution of a segmentation application 22 of the segmentation device 16, the segmentation device 16 delineates the OOI 20 in the received image 18. If the received image 18 is four-dimensional, the OOI 20 is delineated in all phases of the received image 18.

When the segmentation application 22 is executed, a user interface thereof is displayed on a display device 24 of the segmentation device 16. The user interface suitably allows an associated user to view the received image 18. Further, the user interface allows the associated user to create and/or modify contours 26, 28 on the received imaged 18 using a user input device 30 of the of the segmentation device 16. A contour specifies the boundary of a region, such as a lesion, in a two-dimensional image space. Hence, the associated user can, for example, employ a mouse to draw a contour on the received image 18 and/or resize a contour on the received image 18. In some embodiments, the user interface further allows the associated user to specify parameters for segmentation using the user input device 30.

Figure 4:
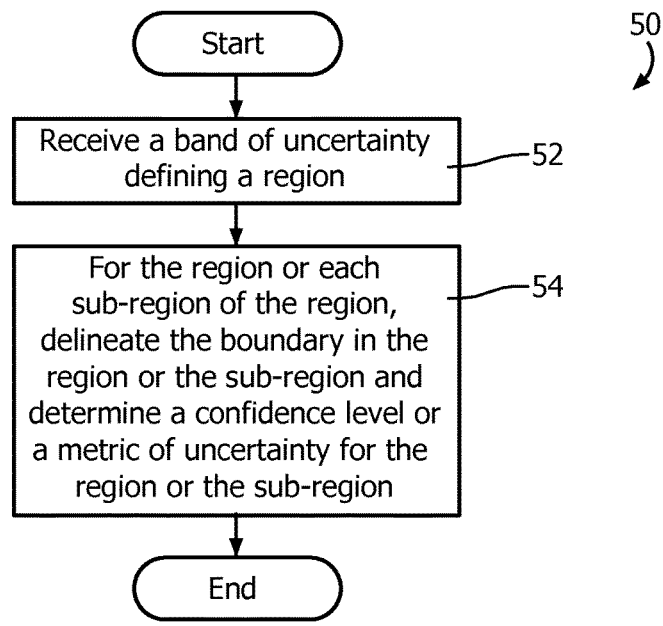
FIGS. 4 and 5 illustrate a block diagram of a method for delineating an object of interest in a image.

To delineate the OOI 20 in the received image 18, the segmentation application 22 employs a method 50 of FIG. 4. According to the method 50, a band of uncertainty 32, an example of which is illustrated in FIGS. 2 and 3, is received 52 for the received image 18. The band of uncertainty 32 is defined by an outer contour 26 and an inner contour 28, which collectively identify a region 34 within which the boundary of the OOI 20 is expected. The region 34 typically includes a portion of the received image 18, but can also include the entire image. The outer contour 26 marks a region within which the boundary of the OOI 20 is, and the inner contour 28 marks a region outside of which the boundary of the OOI 20 is.

Typically, the associated user draws the band of uncertainty 32 using the user interface such that the inner contour 28 and the outer contour 26 are received from the user input device 30. However, the band of uncertainty 32 can be received from other sources. For example, the band of uncertainty 32 can be received from an algorithm for automatically determining the band of uncertainty 32.

After receiving the band of uncertainty 32, for the region 34 or each of a plurality of sub-regions of the region 34, the boundary is delineated 54 in the region 34 or the sub-region and a confidence level or a metric of uncertainty is determined 54 for the region 34 or the sub-region. The sub-regions each span from the inner contour 28 to the outer contour 26. Further, the sub-regions can at least partially be identified by the associated user using the user interface. Additionally or alternatively, the sub-regions can at least partially be identified using an algorithm. For example, the band of uncertainty 32 can be broken into a predetermined number of sub-regions of equal area. The sub-regions can be processed sequentially and/or in parallel.

Figure 5:
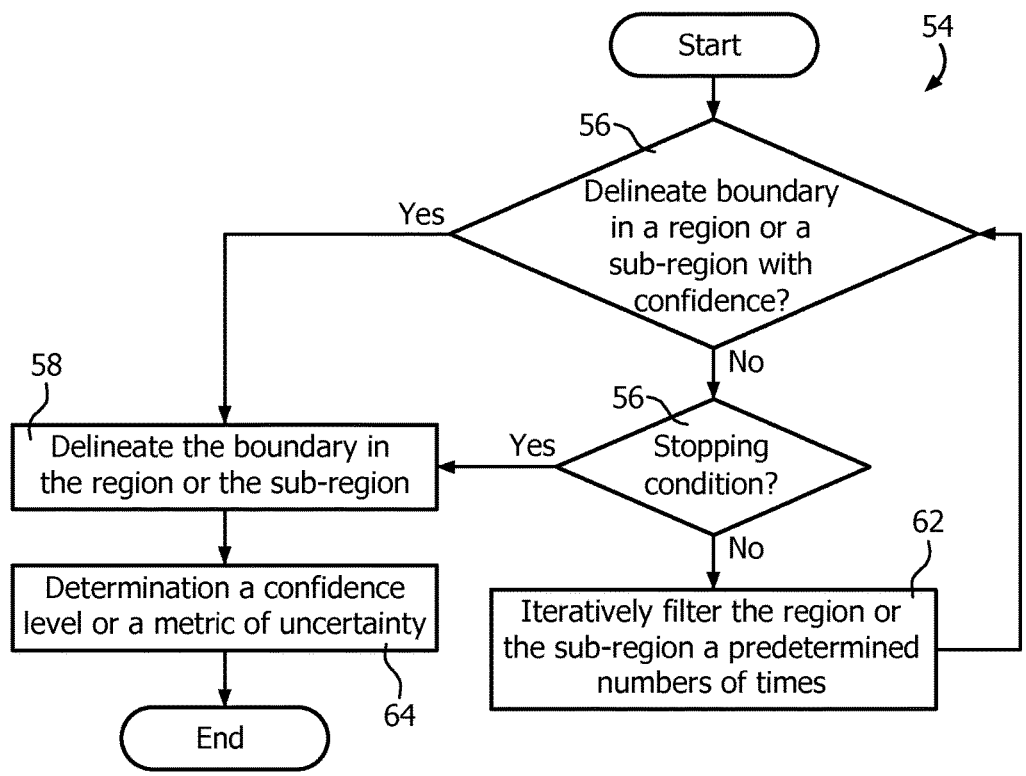
Figure 6A:
Figure 6B:
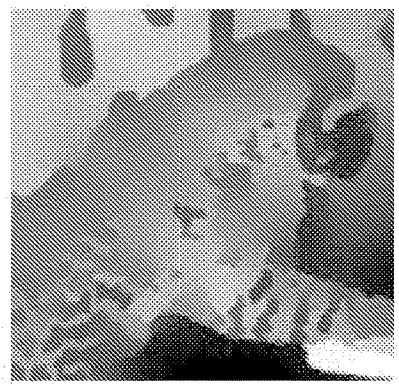
Figure 6C:
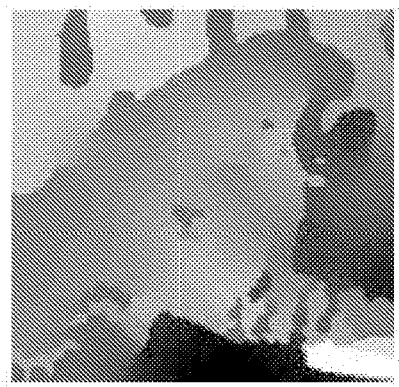
Figure 6D:
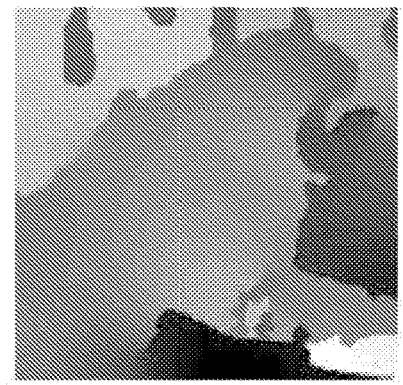

With reference to FIG. 5, to delineate 54 the boundary in the region 34 or the sub-region and determine 54 a confidence level or a metric of uncertainty for the region 34 or the sub-region, a determination 56 is made as to whether it is possible to determine the boundary of the OOI 20 in the region 34 or the sub-region. The determination 56 can be performed manually and/or automatically. As to the former, the manual determination can be made by the associated user through receipt of data from the user input device 30. For example, the associated user can view the received image 18 using the user interface to make the determination. The boundary can be manually determined with confidence if the boundary points can be visually delineated in the received image 18. As to the latter, an algorithm can be employed to assess whether it is possible to determine the boundary of the OOI 20 in the region 34 or the sub-region with confidence. The boundary can be automatically determined with confidence if the boundary points include a strength exceeding that of other points in the filtered image.

If it is possible to manually and/or automatically determine the boundary of the OOI 20 in the region 34 or the sub-region with confidence, the boundary is manually and/or automatically delineated 58 in the received image 18. As to the former, the user interface can be employed to allow the associated user to draw at least part of a contour around the OOI 20 of the region or the sub-region. As to the latter, an algorithm can be employed. If it is not possible to manually and/or automatically determine the boundary of the OOI 20 in the region 34 or the sub-region with confidence, a determination 60 is made as to whether a stopping condition is met.

A stopping condition indicates that enhancement of the region 34 or the sub-region is of no value. The stopping condition can be, for example, a predetermined number of iterations, discussed below, a confidence level of the boundary being less than a predetermined level, or an intensity gradient of the points in the region 34 or the sub-region being zero or uniform. Confidence can be assessed using a function of at least the number of iterations, discussed below. If the stopping condition is reached, the boundary is typically not clearly visible or a uniform density is obtained. To address this, the associated user can delineate 56 the boundary of the OOI 20 in the region 34 or the sub-region using another image and, optionally, register the other image to the received image 18. Additionally, or alternatively, the boundary of the OOI 20 in the region 34 or the sub-region can be delineated 56 in the received image 18 along the midline of the region 34 or the sub-region.

If the stopping condition is not reached, a filtering algorithm for enhancing edges is then iteratively run 62 in the region 34 or the sub-region for a predetermined number of iterations, such as five iterations, and the determination 56 is repeated. Typically, the filtering algorithm is a stochastic scale space algorithm, but any filtering algorithm can be employed. The predetermined number of iterations is suitably determined by the associated user and/or an administrator of the segmentation device 16. Further, the predetermined number is the number of iterations the one determining the predetermined number deems to be sufficient to achieve a noticeable enhancement to the region 34 or the sub-region.

FIG. 6 illustrates several images where the edge is strengthened to an extent that it can be subsequently delineated just by thresholding. FIG. 6A shows the original image, FIG. 6B shows the original image after 50 iterations of the filtering algorithm, FIG. 6C shows the original image after 100 iterations of the filtering algorithm, and FIG. 6D shows the original image after 200 iterations of the filtering algorithm. Hence, FIG. 6 illustrates the progression of edge enhancement for an increasing number of iterations.

In order to speed up the method 50, the filtering of the region 34, the filtering can be done only across the boundary (i.e., the direction perpendicular to the boundary direction). In that regard, the region 34 of the band of uncertainty 32 can be divided into the plurality of sub-regions, one for each point within the band of uncertainty 32 (hereafter referred to as a point of uncertainty). The sub-region for a point of uncertainty 36 is defined by all the points along an outer line segment 38 and inner line segment 40, examples of which are illustrated in FIG. 7, of the point of uncertainty 36. The outer line segment 38 is determined by joining the point of uncertainty 36 with its projection on the outer contour 26, and the inner line segment 40 is determined by joining the point of uncertainty 36 with its projection on the inner contour 28. The projection of the point of uncertainty 36 on the outer contour 26 is the point on the outer contour 26 which is closest to the point of uncertainty 36, and the projection of the point of uncertainty 36 on the inner contour 28 is the point on the inner contour 28 which is closest to the point of uncertainty 36. As should be appreciated, the plurality of sub-regions includes overlapping sub-regions.

Referring back to FIG. 5, once the boundary of the OOI 20 is determined for the region 34 or the sub-region, a confidence level or a metric of uncertainty is determined 64 for the region 34 or the sub-region. The confidence level and the metric of uncertainty are based on the extent of filtering needed to determine the boundary. Further, the metric of uncertainty and the confidence level are inversely related. For example, as the number of filtering iterations increase, the uncertainty increases and the confidence level decreases. Hence, the confidence level can be determined from the metric of uncertainty and vice versa.

For example, uncertainty for the region 34 or the sub-region can be determined as follows. If the boundary of the region 34 or the sub-region was drawn with confidence without any filtering, an uncertainly value of 0 can be assigned to the region 34 or the sub-region. If the boundary was determined at the nth iteration, a value between 0 and 100 can be chosen, depending on the number of iterations n and the strength F of the boundary. One choice for such a metric is:

$$\text{Uncertainty}(x) = 100 * \exp(-\nabla F(x)/n),$$

where x is the number of iterations and $\nabla'F(x)$ is strength gradient of the region 34 or the sub-region. Other choices are also possible, provided they preserve continuity at the limit points (i.e., the metric should be 0 when n=0 and 100 when the gradient F(x) is 0). If the midline of the region 34 or the sub-region was employed, the region 34 or the sub-region can be assigned a maximum uncertainty value (e.g., 100). Confidence can then be defined as the additive inverse of Uncertainty with respect to 100. In other words, confidence can be defined as follows:

$$\text{Confidence}(x) = 100 - \text{Uncertainty}(x)$$

Once the boundary of the region 34 or all of the sub-regions is identified, the segmentation is complete. The contour corresponding to the identified boundary can then be displayed with the received image 18 using the user interface. Further, the contour can be color coded according to confidence level and/or metric of uncertainty. For example, each boundary point can be assigned a color unique to the corresponding confidence level or metric of uncertainty.

Using the boundary along with the corresponding confidence level and/or metric of uncertainty, clinicians can diagnose a patient and determine the best treatment options. Clinicians use the irregular and imprecise nature of the boundary as an important characteristic of tumors, which distinguishes them from benign lesions. For example, tumor boundary irregularity can be used to distinguish between active tuberculosis nodules and malignant lesions. Confidence level and/or metric of uncertainty can be employed to determine whether a boundary is irregular and imprecise. Further, the confidence of the final diagnosis can be determined based on confidence level and/or metric of uncertainty of the segmentation. More conservative treatment options can be employed when, for example, the confidence in the final diagnosis is low.

Referring back to FIG. 1, the segmentation device 16 include at least one processor 42 executing computer executable instructions on at least one memory 44 thereof. The computer executable instructions carry out the functionality of the segmentation device 16 and include the segmentation application 22. Further, the segmentation device 16 can include a communication unit 46 and/or at least one system bus 48. The communications unit 46 provides the processor 42 with an interface to at least one communication network. The communications unit 46 can, for example, be employed to communicate with the imaging modalities 12 and/or the image memories 14. The system bus 48 allows the exchange of data between the display device 24, the user input device 30, the processor 42, the memory 44 and the communication unit 46.

As used herein, a memory includes one or more of a non-transient computer readable medium; a magnetic disk or other magnetic storage medium; an optical disk or other optical storage medium; a random access memory (RAM), read-only memory (ROM), or other electronic memory device or chip or set of operatively interconnected chips; an Internet/Intranet server from which the stored instructions may be retrieved via the Internet/Intranet or a local area network; or so forth. Further, as used herein, a processor includes one or more of a microprocessor, a microcontroller, a graphic processing unit (GPU), an application-specific integrated circuit (ASIC), a field-programmable gate array (FPGA), and the like; a user input device includes one or more of a mouse, a keyboard, a touch screen display, one or more buttons, one or more switches, one or more toggles, and the like; a database includes one or more memories; and a display device includes one or more of a LCD display, an LED display, a plasma display, a projection display, a touch screen display, and the like.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A method for quantification of irregularity of a boundary of a lesion, said method comprising:
   receiving an image including the lesion;
   receiving a band of uncertainty delineating a region in the received image, the region including the boundary of the lesion;
   delineating the boundary of the lesion in the region using iterative filtering of the region, the iterative filtering of the region including applying n iterations of an iteratively running edge-enhancing iterative algorithm including, for each of at least one of a plurality of sub-regions defining the region;
   iteratively filtering the sub-region until the boundary in the sub-region can be delineated with a confidence level exceeding a predetermined level; and,
   delineating the boundary in the filtered sub-region;
   determining at least one metric of uncertainty of the delineated boundary of the lesion for the region based on the number of iterations n according to uncertainty $(x)=100*\exp(\nabla F(x)/n)$, where n is a specific iteration, x is the number of iterations and $F(x)$ is strength gradient of the sub-region;
   controlling a display device to display a contour representing the delineated boundary of the lesion, the contour being color coded according to metric of uncertainty to determine irregularity of the boundary of the lesion.

2. The method according to claim 1, further including:
   for each of the at least one of the plurality of sub-regions:
   determining the metric of uncertainty of the delineated boundary of the lesion for the sub-region, the metric of uncertainty based on the number of iterations.

3. The method according to claim 1, wherein the plurality of sub-regions include a sub-region for each point of uncertainty within the region, the sub-region defined by the points of an inner line segment and an outer line segment of the point of uncertainty, the inner line segment spanning from the point of uncertainty to a projection of the point of uncertainty on an inner contour of the band of uncertainty, and the outer line segment spanning from the point of uncertainty to a projection of the point of uncertainty on an outer contour of the band of uncertainty.

* * * * *